United States Patent
Nguyen

(10) Patent No.: US 12,407,642 B2
(45) Date of Patent: Sep. 2, 2025

(54) ALIAS VERIFICATION

(71) Applicant: Yokogawa Electric Corporation, Tokyo (JP)

(72) Inventor: Vien Nguyen, Frisco, TX (US)

(73) Assignee: GOOGLE LLC, Mountain View, CA (US)

( * ) Notice: Subject to any disclaimer, the term of this patent is extended or adjusted under 35 U.S.C. 154(b) by 60 days.

(21) Appl. No.: 18/375,883

(22) Filed: Oct. 2, 2023

(65) Prior Publication Data

US 2025/0112887 A1   Apr. 3, 2025

(51) Int. Cl.
*H04L 61/3015*   (2022.01)
*H04L 61/4541*   (2022.01)

(52) U.S. Cl.
CPC ...... *H04L 61/3015* (2013.01); *H04L 61/4541* (2022.05)

(58) Field of Classification Search
CPC .................. H04L 61/3015; H04L 61/4541
USPC .................................................. 709/245
See application file for complete search history.

(56) References Cited

U.S. PATENT DOCUMENTS

| | | | |
|---|---|---|---|
| 8,001,271 B1 * | 8/2011 | Malan | H04L 61/58 709/245 |
| 10,931,630 B2 * | 2/2021 | Dias | H04L 67/141 |
| 11,201,853 B2 * | 12/2021 | Ogale | H04L 61/4511 |
| 2006/0251239 A1 * | 11/2006 | Taylor | H04L 61/45 379/355.04 |
| 2010/0088276 A1 | 4/2010 | Mostafa | |
| 2015/0012666 A1 | 1/2015 | Pannese et al. | |
| 2020/0153838 A1 * | 5/2020 | Ge | H04L 63/102 |

FOREIGN PATENT DOCUMENTS

| | | | | |
|---|---|---|---|---|
| CN | 111600739 | | 8/2020 | |
| CN | 111600739 A | * | 8/2020 | ......... H04L 41/0813 |

\* cited by examiner

*Primary Examiner* — Wing F Chan
*Assistant Examiner* — John Fan
(74) *Attorney, Agent, or Firm* — Gray Ice Higdon

(57) ABSTRACT

Implementations described herein relate to periodically verifying aliases, e.g., by causing cross-platform clients to periodically verify aliases with cross-platform servers to which they are subscribed. In various implementations, a global discovery server (GDS) may be queried for a mapping between an alias and a connection string of an input-output (I/O) channel hosted by a distributed control node (DCN). A cross-platform client may be subscribed to the I/O channel by establishing a persistent network connection using the connection string. The persistent network connection may be used to obtain, from a local alias database of the DCN, a locally updated list of mappings between aliases and connection strings. A discrepancy may be identified between the locally updated list of mappings and the mapping between the alias and the connection string of the I/O channel hosted by the DCN. Based on the discrepancy, various remedial actions may be taken.

20 Claims, 6 Drawing Sheets

ALIAS VERIFICATION

BACKGROUND

Process automation facilities may include a myriad of components including sensors, actuators, function blocks, and distributed control nodes (DCNs), among other components. Tracking these components using traditional identification techniques may present various challenges. Connection strings, which may include networking information such as IP addresses and TCP/UDP ports of individual nodes, as well as node IDs used to identify individual components, such as sensors or actuators that are accessible via those nodes, are not readily interpretable by humans, and do not easily scale. Accordingly, an architecture, such as an Open Platform Communications Unified Architecture (OPC UA), may include a Global Discovery Server (GDS) that provides an "Alias Name Service" (ANS) that facilitates the mapping of aliases (strings of characters that are human-readable/meaningful) to individual process automation nodes. In other words, the GDS can act like a "phone book" for cross-platform components, such as OPC UA clients.

SUMMARY

Aliases are often defined from the ground up. For example, aliases may be defined at DCNs, and the DCNs may register those aliases with the GDS. The GDS may compile a global list of mappings between one or more aliases and one or more connection strings. Over time, changes may occur to the process automation facility. For example, additional aliases may be registered separately, hardware may fail and/or may be replaced, and so forth.

Implementations described herein relate to causing cross-platform clients, such as OPC UA clients, to periodically verify aliases with cross-platform servers, such as OPC UA servers, to which they are subscribed. More particularly, but not exclusively, implementations are described herein for using the existing persistent connection between the OPC UA clients and OPC UA servers. This enables quicker detection of aliases that have changed or moved, and avoids the added complexity and network traffic that would be caused by the cross-platform clients reconnecting to the GDS to retrieve updated aliases.

The techniques described herein provide a number of technical advantages. Automated identification of discrepancies between local alias databases and GDS mappings enables increased data accuracy, which in turn promotes increased productivity and reduced likelihood of critical system failure or underperformance. Additionally, verifying aliases with DCNs, rather than establishing connections to the GDS, may conserve computing resources such as network bandwidth, reduce latency, and/or improve data accuracy.

In some implementations, a method may be implemented, the method including querying a GDS for a mapping between an alias and a connection string of an input-output (I/O) channel hosted by a DCN, subscribing a cross-platform client to the I/O channel, wherein the subscribing includes establishing, between the cross-platform client and the DCN, a persistent network connection using the connection string, obtaining, via the persistent network connection from a local alias database of the DCN, a locally updated list of mappings between aliases and connection strings, identifying a discrepancy between the locally updated list of mappings and the mapping between the alias and the connection string of the I/O channel hosted by the DCN, based on the discrepancy, establishing, a temporary network connection between the cross-platform client and the GDS, and retrieving, from the GDS via the temporary network connection, an updated mapping between the alias and a new connection string.

In some implementations, the new connection string of the updated mapping is associated with a different DCN. In some implementations, the new connection string of the updated mapping is associated with a different I/O channel of the same DCN. In some implementations, the GDS transmits one or more alias updates in response to changes to a compilation of a global list of mappings between aliases and connection strings. In some implementations, the method further comprises subscribing the cross-platform client to an updated I/O channel based on the new connection string of the updated mapping. In some implementations, the discrepancy includes duplicate aliases detected based at least in part on the locally updated list of mappings. In some implementations, the discrepancy includes the alias being missing from the locally updated list of mappings. In some implementations, the method further comprises closing the temporary network connection upon receipt of the updated mapping.

In some implementations, a method may be implemented, the method including identifying, at a first component included in an architecture, a first local list of mappings between aliases and connection strings, querying, based on the identification, a second component of the architecture for a verification of accuracy corresponding to the first local list, identifying, based on receiving a response to the query, a discrepancy between the first local list of mappings and at least a second local list of mappings of the second component, transmitting, based on the discrepancy, a request to the second component or another component of the architecture for an updated list of mappings, and updating, at the first component and in response to receiving the updated list of mappings, the first local list of mappings.

In some implementations, the first component is a cross-platform client and the second component is a GDS. In some implementations, the first component is a cross-platform client and the second component is a DCN. In some implementations, the transmitted request is to the other component, and the other component is a GDS. In some implementations, the first component is a first DCN and the second component is another DCN.

In some implementations, the method further comprises, subsequent to updating the first local list of mappings, modifying one or more subscriptions of the first component based on the updated list of mappings. In some implementations, the method further comprises, prior to querying the second component of the architecture, determining a current persistent connection with the second component. In some implementations, prior to querying the second component, the current persistent connection corresponds with a subscription of the first component to the second component. In some implementations, prior to querying the second component, the second component identifies a modification of one or more features hosted by the second component, wherein the updated list of mappings reflects the modification. In some implementations, based on the updated list of mappings reflecting the modification, the subscription of the first component to the second component is updated or terminated. In some implementations, the method further comprises, subsequent to updating the first local list of mappings, transmitting, from the first component and based on the updated list, a connection request to a third component in the architecture, and identifying, in response to the connection request being affirmed by the third component, one or more new subscriptions between the first component and the third component.

Some implementations include one or more processors of one or more computing devices, where the one or more processors are operable to execute instructions stored in associated memory, and where the instructions are configured to cause performance of any of the aforementioned methods. Some implementations also include one or more non-transitory computer readable storage media storing computer instructions executable by one or more processors to perform any of the aforementioned methods.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Implementations described herein relate to causing cross-platform clients, such as OPC UA clients, to periodically verify aliases with cross-platform servers, such as OPC UA servers, to which they are subscribed. More particularly, but not exclusively, implementations are described herein for using the existing persistent connections between the OPA UA clients and OPC UA servers to perform alias verification. This enables quicker detection of aliases that have changed or moved, and avoids the added complexity and network traffic that would be caused by the cross-platform clients reconnecting to the GDS to retrieve updated aliases. As used herein, a "persistent" connection refers to a network communication channel having an open-ended and/or unrestricted duration or lifespan, e.g., that is left open for subsequent exchanges, rather than being closed after an initial exchange. By contrast, a "temporary" connection refers to a transient network communication channel that is established for purposes of exchanging specific data, and which is closed after the exchange of the specific data is complete.

Aliases may be strings of characters readily interpretable/ meaningful to humans (words, names, phrases, etc.—as opposed to binary characters or hash sequences). In some instances, aliases may be defined in batches, e.g., by way of an alias configuration file that includes a list of aliases and corresponding connection strings. The alias configuration file can be provided and/or modified using a configuration tool, which allows for the creation and/or modification of aliases and causes the corresponding cross-platform clients, such as DCNs, to register those aliases with the GDS. As noted previously, over time, changes may occur to the process automation facility, which may result in one or more alias configuration files becoming stale (outdated, misleading, and/or inaccurate, etc.) for one or more components of the OPC UA. For example, hardware may be removed, hardware may be replaced, and/or additional aliases may be registered separately, resulting in the alias configuration files created prior to these events becoming stale.

The GDS can be operated to create new aliases, modify existing aliases, and/or rectify the aforementioned stale aliases by providing an Alias Name Service (ANS) that facilitates the mapping of aliases (e.g., the strings of characters presented in a readily human-meaningful syntax) to connection strings and node IDs (e.g., strings of characters presented in a readily computer-meaningful syntax). Accordingly, the GDS may include readily interpretable aliases for both human users of the OPC UA and for non-human components of the OPC UA (DCNs, clients, sensors, etc.—if and/or to the extent that these components are separate in a given implementation). As such, the GDS may in some implementations be akin to a "phone book" for OPC UA components and users.

Figure 1:
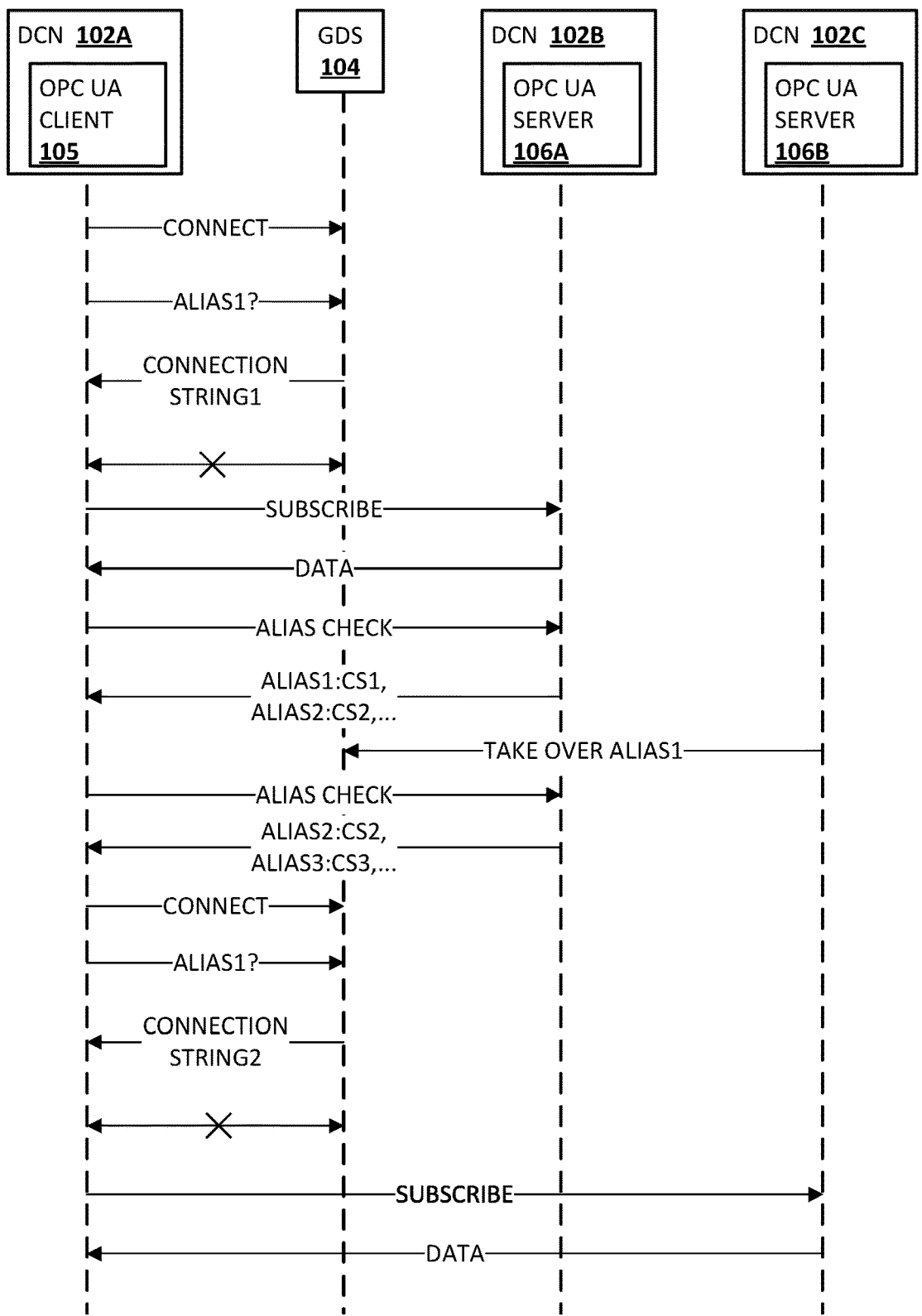
FIG. 1 schematically depicts an environment in which selected aspects of the present disclosure may be implemented, in accordance with various embodiments.

Referring now to FIG. 1, an example environment 100, in which various aspects of the present disclosure may be implemented, is depicted schematically. Starting at the top left. DCN 102A hosting OPC UA client 105 establishes a temporary network connection with GDS 104. Subsequently. DCN 102A queries GDS 104 (e.g. "ALIAS1?"). The query "ALIAS1?" may indicate a request by DCN 102A regarding data associated with "ALIAS1", such as a mapping between "ALIAS1" and a corresponding connection string. Based on that request. GDS 104 transmits "CONNECTION STRING1" to the DCN 102A.

Transmission of "CONNECTION STRING1" from the GDS 104 to DCN 102A may be based on a determination that "ALIAS 1" is associated with "CONNECTION STRING1". "CONNECTION STRING1" (and thus "ALIAS1") may be associated with one or more components, such as DCN 102B and/or a component thereof (e.g., sensor, I/O channel, function block, etc.). Once DCN 102A has obtained the "CONNECTION STRING1" from GDS 104. DCN 102A may close the temporary network connection with GDS 104, as indicated by the "X".

Subsequent to DCN 102A receiving the "CONNECTION STRING1" and closing the temporary connection with GDS 104. FIG. 1 depicts DCN 102A subscribing to DCN 102B. This subscription may include, for example, subscribing OPC UA client 105 to one or more components associated with "CONNECTION STRING1". For example, OPC UA client 105 may subscribe, based on receipt of "CONNECTION STRING1", to I/O channel(s) or function block(s) associated with OPC UA server 106A hosted by DCN 102B. Subscription of DCN 102A to DCN 102B may result in data being exchanged between DCN 102B and DCN 102A. Data exchanged may include, for instance, sensor data associated with an I/O channel corresponding to OPC UA server 106A.

As depicted in FIG. 1, subsequent to DCN 102A receiving data from DCN 102B. DCN 102A may perform an "ALIAS CHECK" on DCN 102B. However, implementations disclosed herein are not limited to the temporal limitations depicted in accompanying Figures. Accordingly, in some implementations. DCN 102A may perform an "ALIAS CHECK" prior to, concurrently to, and/or subsequently to receiving any data from DCN 102B. In some implementations, alias checks correlate to potential facility changes.

In response to DCN 102A performing an "ALIAS CHECK" with DCN 102B (which may include DCN 102A prompting DCN 102B for an alias and/or connection string associated with DCN 102B) DCN 102B may send, to at least DCN 102A, a locally updated list of mappings between alias(es) and/or connection string(s) ("ALIAS1:CS1, ALIAS2:CS2 . . . "). If there are no discrepancies detected between one or more aliases of which DCN 102A is aware and those conveyed in the locally updated list of mappings received from DCN 102B, no further action may need to be taken.

However, at some point, and as depicted in FIG. 1. DCN 102C (or a component thereof) may, temporarily or for a sustained period of time. "TAKE OVER ALIAS1". For example, if a temperature sensor (e.g. thermometer, thermocouple, thermostat, etc.) associated with "ALIAS1" is moved from DCN 102B to DCN 102C. DCN 102C may now become associated with (e.g. "TAKE OVER") "ALIAS1". In response. DCN 102C may transmit, to GDS 104, an indication of DCN 102C taking over "ALIAS1". Accordingly, GDS 104 may store this updated information. In some implementations, due to latency, network constraints, etc., GDS 104 may not immediately and/or automatically (i.e. without prompt from a user and/or component) transmit said updated information to other DCNs (102A, 102B, . . . , etc.). In some implementations, the updated information may only be transmitted from GDS 104 to a corresponding DCN subsequent to the corresponding DCN querying GDS 104 for said updated information.

Some time after DCN 102C takes over ALIAS1, DCN 102A may perform another alias check with DCN 102B. Due to DCN 102A performing an alias check with DCN 102B subsequent to DCN 102C taking over "Alias 1", DCN 102A receives a transmission from DCN 102B indicating that DCN 102B is now associated with "ALIAS2:CS2, ALIAS3:CS3", as opposed to also being associated with "ALIAS1" and "CONNECTION STRING1".

DCN 102A, in response to receiving the transmission from DCN 102B indicating that DCN 102B is only associated with "ALIAS2:CS2, ALIAS3:CS3", may establish at least a temporary network connection with GDS 104. DCN 102A may then send a request/command "ALIAS1?" to GDS 104 for an updated mapping between "ALIAS1" and a new connection string. GDS 104 may identify DCN 102C (or one or more components thereof) associated with "ALIAS1", and send a connection string associated with the identified DCN 102C to DCN 102A.

In some implementations, it may not be possible for GDS to identify an appropriate DCN. For example, if a component is identified as failed or removed. GDS 104 may not send identification of a DCN (to which the alias was formerly associated with) to a requesting component. GDS 104 may instead send a notification that the component has failed or has been removed. However, as depicted in FIG. 1 and discussed previously. "ALIAS1" is identified by GDS 104 as being, or having been, taken over by DCN 102C. Accordingly. GDS 104 may respond to DCN 102A's request for targeting "ALIAS1" by identifying DCN 102C via GDS 104's transmission of "CONNECTION STRING 2".

As depicted in FIG. 1, DCN 102A may receive, in response to DCN 102A's request to GDS 104, a transmission, e.g. "CONNECTION STRING2". "CONNECTION STRING2" may include information indicating the DCN 102C (or one or more components thereof) is associated with "ALIAS1". DCN 102A, subsequent to receiving the transmission from GDS 104 "CONNECTION STRING2", may close the connection with GDS 104. DCN 102A may, based on the information indicating that DCN 102C is associated with "ALIAS1", and subsequent to closing the connection with GDS 104, subscribe to DCN 102C. Subsequent to DCN 102A subscribing to DCN 102C, data may be exchanged from DCN 102A and DCN 102C.

Although FIG. 1 depicts data transfer using one-way arrows, implementations are not necessarily limited to one-way communications between the depicted components. For example, although the implementation discussed herein as related to FIG. 1 focuses on DCN 102A receiving information associated with "ALIAS1", DCN 102A may also transmit information to various components in the architecture.

Figure 2A:
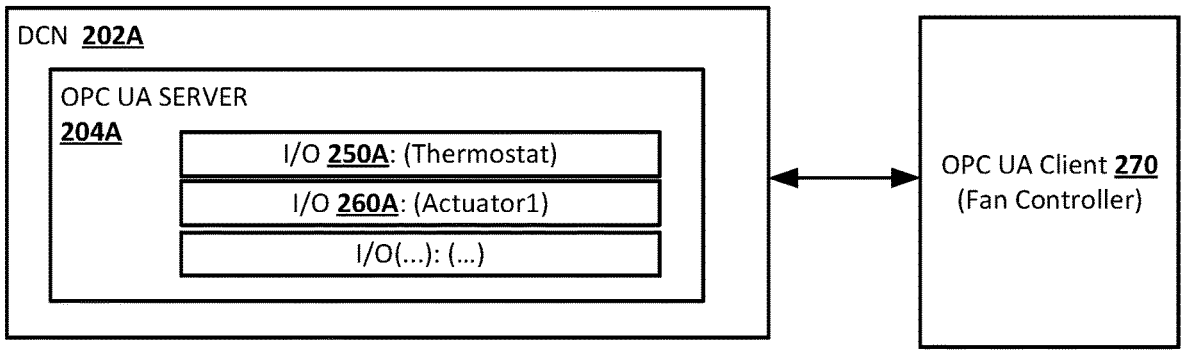
FIG. 2A, FIG. 2B, and FIG. 2C schematically depict examples of how techniques described herein may be implemented, in accordance with various embodiments.
Figure 2B:
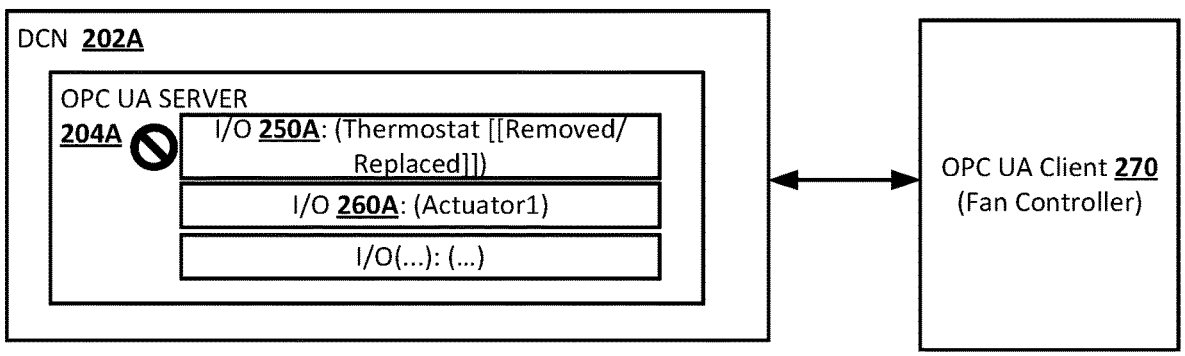
Figure 2C:
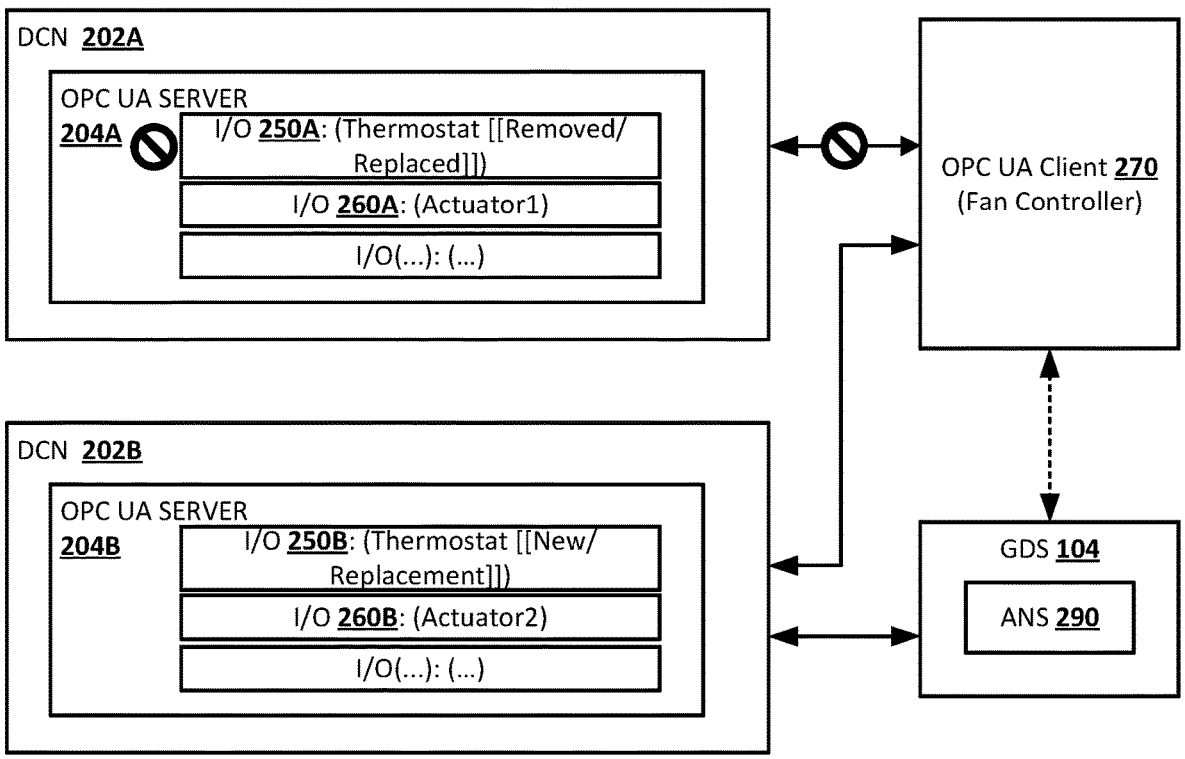

Referring now to FIGS. 2A-2C, example environments 200A-200C are schematically depicted, and include various aspects of the disclosure which may be present in some implementations. In FIG. 2A, DCN 202A may include OPC UA Server 204A which may itself include I/O Channel 250A associated with alias "Thermostat" and subscribed to by OPC UA client 270 "Fan Controller", and I/O Channel 260A associated with alias "Actuator1". In some implementations, OPC UA client 270 "Fan Controller" may also be subscribed to I/O 260A "Actuator1". As a result of OPC UA client 270 "Fan Controller" subscribing to I/O Channel 250A "Thermostat", data indicative of the I/O Channel 250A "Thermostat" may be transmitted to OPC UA client 270 "Fan Controller". OPC UA client 270 "Fan Controller" may use the data received from I/O 250A "Thermostat" to control one or more aspects of a process in a facility.

Referring now to FIG. 2B, a physical sensor (e.g., thermostat) associated with I/O Channel 250A "Thermostat" has been removed, transferred, or replaced. In some implementations, removal of the physical sensor associated with I/O Channel 250A may result in a lack of data. In some implementations, transfer of the physical sensor associated with I/O Channel 250A "Thermostat" to a different location (e.g. another DCN), may result in stale and/or inaccurate data. In some implementations, replacement of the sensor (e.g. replacement of a thermostat with a photosensor) may also result in stale and/or inaccurate data.

As depicted in FIG. 2B, OPC UA client 270 "Fan Controller"—unaware of the aforementioned sensor removal, transfer, or replacement—remains subscribed to I/O 250A "Thermostat" of DCN 202A, even though no data, or perhaps stale data, is being generated. If, for example, a different physical sensor, such as a photosensor, became associated with I/O Channel 250A "Thermostat" of DCN 202A, and the photosensor generated data associated with I/O Channel 250A "Thermostat", then OPC UA client 270 "Fan Controller" may continue to perform its role in the process automation facility based on the wrong data (i.e. based on photosensor data believed to be associated with the physical thermostat sensor).

Referring now to FIG. 2C. OPC UA client 270 may verify aliases with DCN 202A. In response to verification of aliases with DCN 202A. OPC UA client 270 may determine that the alias "Thermostat" is no longer associated with DCN 202A (as indicated by the prohibition symbol). In some implementations, the lack of association can result from a system integrator exclusively assigning that alias to a different component of an architecture. In some implementations, the lack of association may result from multiple instances of the same alias being present, and one or more components of the architecture determining an instance of the duplicated aliases as superseding others. Regardless, based on determining that alias "Thermostat" is no longer associated with DCN 202A, OPC UA client 270 may cease connection with DCN 202A and/or connect with GDS 104. As per FIG. 2C, OPC UA client 270 "Fan Controller" establishes at least a temporary connection with GDS 104, which includes ANS 290 to facilitate the mapping of aliases to components in the architecture, including mapping alias "Thermostat" to one or more connection strings.

FIG. 2C also depicts DCN 202B, which hosts OPC UA Server 204B, and includes I/O Channel 250B and I/O Channel 260B. I/O Channel 250B is now associated with alias "Thermostat" and I/O Channel 260B is associated with alias "Actuator2". As discussed herein, aliasing may be performed by a user/system integrator, or may be performed automatically by one or more components, including the ANS 290. For example, ANS 290 may detect, independently or based on data received from other components in an architecture, an update regarding an alias, connection string, and corresponding component.

Subsequent to I/O Channel 250B being associated with alias "Thermostat", DCN 202B may transmit data indicating said alias "Thermostat" being associated with I/O 250B to GDS 104. GDS 104 may store data indicating aliases associated with components of an architecture. However, as discussed previously, resource and network constraints may constrain GDS 104's ability to automatically and/or immediately transmit the stored data indicating aliases to interested components in network with GDS 104. Accordingly, GDS 104 may, in some implementations, store indicating aliases for a considerable period of time (as non-limiting examples of magnitude, 1 second, 1 minute, 1 hour, 1 day, 1 week, etc.) prior to automatically transmitting the stored data to interested components—that is, if GDS 104 is configured to automatically (without request) transmit the stored data at all. As such, OPC UA client 270 "Fan controller" may query GDS 104 prior to GDS 104 transmitting the stored data indicating I/O channel 250B's association with alias "Thermostat".

In response to a query from OPC UA client 270 "Fan Controller", GDS 104 may transmit data indicating I/O Channel 250B's alias "Thermostat" to OPC UA client 270 "Fan Controller". Based on the data indicating I/O Channel 250B's alias "Thermostat", OPC UA client 270 "Fan Controller" may subscribe to I/O Channel 250B "Thermostat" of DCN 202B. OPC UA client 270 "Fan Controller" may also cease connection with GDS 104 subsequent to receiving the data indicating I/O channel 250B's alias "Thermostat".

e.g. As discussed herein, an OPC UA server may maintain an up-to-date list of the aliases it currently hosts, and therefore may be able to provide the OPC UA client a list of those current aliases in the alias update. Thus, and as is shown in FIGS. 1 and 2A-C, an OPC UA client 270 may periodically request that a OPC UA server 204, which hosts an I/O channel associated with an alias which the OPC UA client is seeking to be subscribed to, provide an "alias update." The OPC UA client 270 may then check the list of aliases provided in the alias update against a local list of aliases. If there is a discrepancy, the OPC UA client may establish a connection to a GDS to identify up-to-date I/O channels corresponding to one or more aliases subscribed to by the OPC UA client.

In some implementations, the OPC UA server may, with or without a request by a OPC UA client, proactively publish an alias update to one or more components in an architecture. The OPC UA server could do this periodically, and/or in response to any changes to one or more aliases. Changes may be the result of a variety of events, such as addition, replacement, and/or removal of one or more aliases by the GDS or by an engineer.

Figure 3:
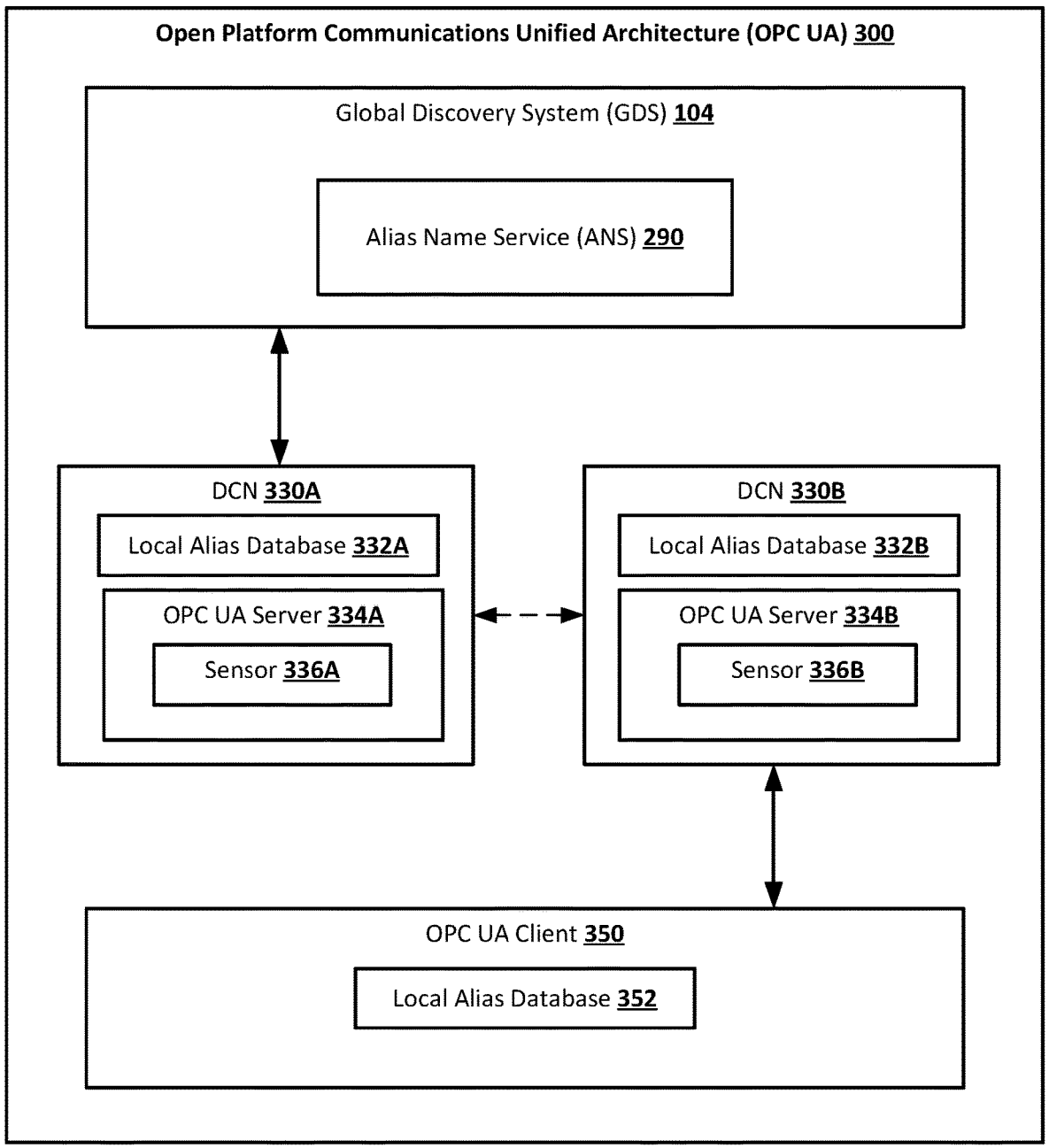
FIG. 3 schematically illustrates a further example of how techniques described herein may be implemented.

It may not always be necessary for a DCN to reestablish a temporary connection with GDS 104 to retrieve updated aliases. For example, in some implementations, a first DCN configured with selected aspects of the present disclosure may leverage a second DCN's temporary connection with GDS 104 to facilitate alias updating, without the first DCN needing to establish its own temporary connection with GDS 104. FIG. 3 depicts an OPC UA 300 in which DCN 330B and OPC UA client 350 are in with each other over a persistent connection, and wherein GDS 104 and DCN 330A are in temporary communication with each other.

While DCN 330A may be capable of directly interacting with GDS 104 for alias verification and/or an updating alias mapping, neither DCN 330B nor OPC UA client 350 are immediately capable of doing the same due to a current lack of direct connection to GDS 104. However, as discussed previously, DCN 330B and OPA UA client 350 are capable of exchanging information regarding alias verification and/or updating alias mapping with each other.

In some implementations, components of the OPC UA 300 may be capable of propagating alias verifications and/or updated alias mappings requests to GDS 104 indirectly, e.g., by relaying information through one or more other components. For example, OPC UA client 350 may propagate an alias verification and/or updated alias mapping request through DCN 330B, then to DCN 330A via a connection (shown in dashed lines) that may be established temporarily or that is already established, and then to GDS 104. Subsequently, GDS 104 may propagate a response back through the same components to OPC UA client 350.

Alternatively, at any point during propagation of a query and/or request a connection may be made between components to skip additional components of the propagation chain. For example, OPC UA client 350 may propagate a query to DCN 330B which may establish at least a temporary connection with GDS 104 without further propagating the query through DCN 330A. Similar connections may also occur subsequent to GDS 104 receiving a query, such that even if a query was propagated through a plurality of components in the OPC UA 300 system. GDS 104 may respond directly to OPC UA client 350, e.g., by establishing a temporary connection.

In some cases, local alias databases (e.g., 332, 352) may be so up-to-date that they include sufficiently updated mappings to respond to a query without interacting with GDS 104. In FIG. 3, for instance. DCN 330A may, through its existing connection to GDS 104, have recently received updated alias mappings. Accordingly, if a query is propagated from OPC UA 350 to DCN 330B, then to DCN 330A (which has updated alias mappings and hence, may know the response), then DCN 330A can respond to the query without necessarily further propagating the query further to GDS 104. In some implementations. DCN 330A's response may occur through the same propagation channel or via establishment of a direct communication channel.

Figure 4:
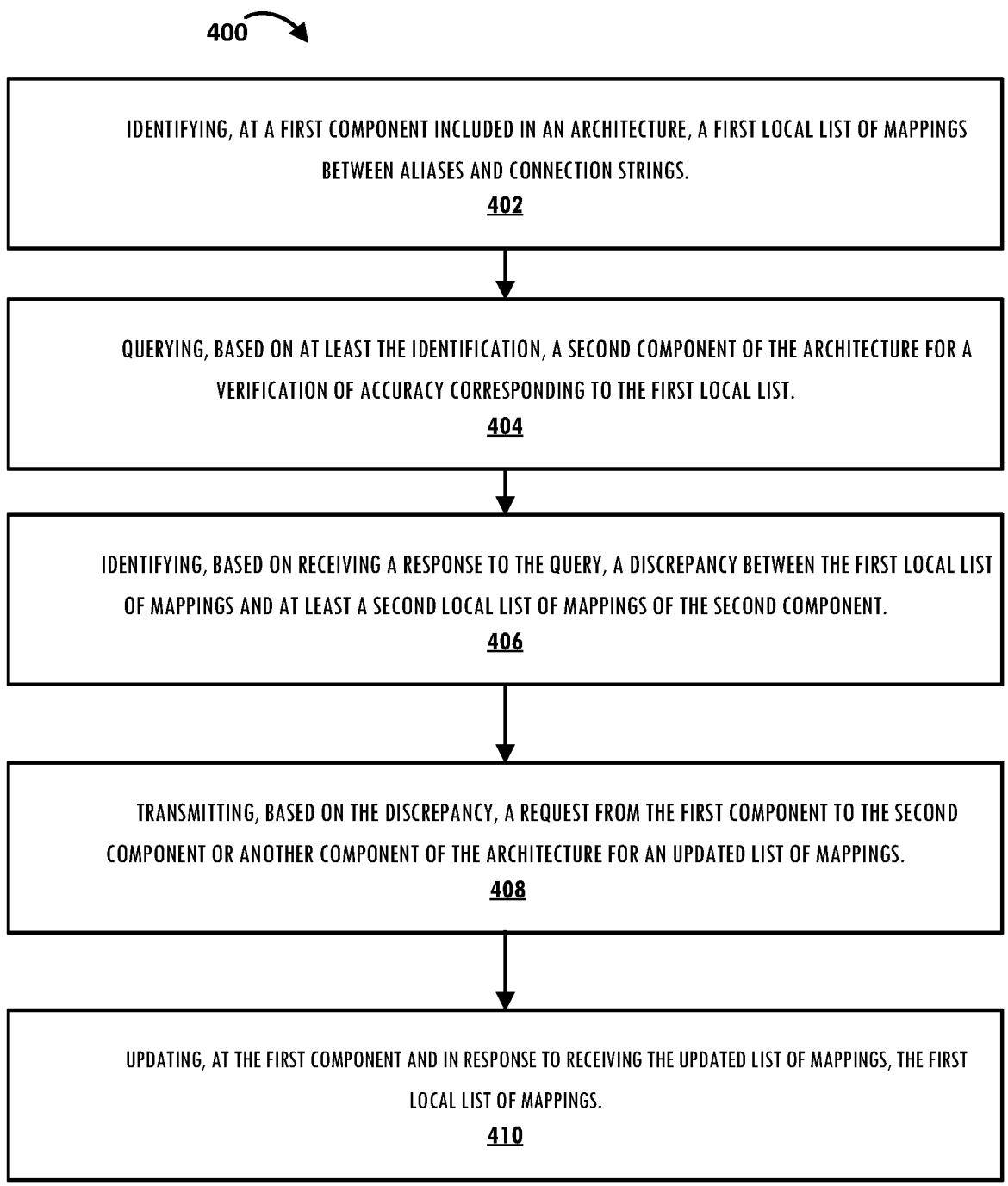
FIG. 4 schematically illustrates an example method for performing selected aspects of the present disclosure.

FIG. 4 is a flowchart illustrating an example method 400 of practicing selected aspects of the present disclosure, in accordance with implementations disclosed herein. For convenience, the operations of the flow chart are described with reference to a system that performs the operations. This system may include various components of various computer systems, such as one or more components of OPC UA 300 and/or depicted in FIGS. 1-2. Moreover, while operations of method 400 are shown in a particular order, this is not meant to be limiting. One or more operations may be reordered, omitted, and/or added.

At block 402, a first component of an architecture identifies a first local list of mappings between aliases and connection strings. OPC UA 300 represents an exemplary architecture in which the sequence of FIG. 4 may be implemented. The first component may be GDS 104, DCN 330, and/or OPC UA client 350. The first local list may be stored on a local database of the first component. For example, the first local list may be stored on ANS 290, local alias database 332, 352, etc.

At block 404, a second component of the architecture is queried for a verification of accuracy corresponding to the first local list of mappings. The second component may be queried based on, and/or in response to, the identification of the first local list in block 402. In some implementations, the query for the verification of accuracy comprises a request from the first component to the second component for an identification of one or more similarities and/or differences between the first local list of mappings and a second local list of mappings. The second local list of mappings may be stored on the second component, and/or another component in communication with the second component. In some implementations, the first component is a cross-platform client (e.g. 350) and the second component is a DCN (e.g. 330A/B). In some implementations, the first component is a first DCN (e.g. 330A) and the second component is another DCN (e.g. 330B). In some implementations, the first component is a cross-platform client (e.g. 350) and the second component is a GDS (e.g. 104).

In some implementations, prior to the second component being queried, a current persistent connection between the first component and the second component is determined. The current persistent connection may correspond to a subscription of the first component to the second component. For example, the first component may subscribe to one or more I/O channels or function blocks hosted on the second component At block 406, a discrepancy is identified between the first local list of mappings and at least a second local list of mappings of the second component. In some implementations, the discrepancy of block 406 may be identified by the first component based on receiving a response from the second component to the query of block 404. In some implementations the second component may identify a modification to one or more features hosted on the second component. The second component's response to the query from the first component may reflect the modification to the one or more features. The discrepancy identified may correspond to the modification.

At block 408, the first component transmits a request for an updated list of mappings. The request may be transmitted based on the discrepancy identified in block 406, but may alternatively be transmitted based on various other criteria. The various other criteria may include, for example, time passed relative to a previous request for an updated list, estimated accuracy of a given local list corresponding to a given local component of the architecture, and/or feedback from a user/system integrator.

In some implementations, the query of block 404 and the request of 408 may both be transmitted to the same (e.g. second) component. For example, the first component may be an OPC UA client (e.g. 350), and the second component may be a DCN (e.g. 330A/B). Subsequent to querying DCN 330A/B for a verification of accuracy in step 404, and identifying the discrepancy during block 406, the OPC UA client 350 may request the updated list of mappings from DCN 330A/B. This implementation may be especially relevant in circumstances, for example, in which DCN 330A/B may be capable of verifying accuracy (e.g. DCN 330A/B may recognize a component formerly hosted on DCN 330A/B as being removed), and may also be capable of verifying a comprehensive updated mapping (e.g. DCN 330A/B may accurately recognize where the component formerly hosted on DCN 330A/B has been moved to).

In some implementations, the transmitted request is to a third (e.g. not the second) component. In some of those implementations, the first component may be an OPC UA client (e.g. 350), the second component may be a DCN (e.g. 330A/B), and the third component may be GDS (e.g. 104). Subsequent to OPC UA client 350 querying DCN 330A/B in step 404, and identifying the discrepancy in block 406, the OPC UA client 350 may request an updated list of mappings from GDS 104. This implementation may be especially relevant in circumstances, for example, in which DCN 330A/B may be capable of verifying accuracy (e.g. DCN 330A/B may recognize a component formerly hosted on DCN 330A/B as being removed), but may not be immediately capable of providing a comprehensive updated mapping (e.g. DCN 330A/B may not accurately recognize where the component formerly hosted on DCN 330A/B has been moved to).

At block 410, the first component receives the updated list of mappings and updates the first local list of mappings based on the updated list. The updated list of mappings may be received in response to the query of block 408.

In some implementations, prior to receiving the updated list of mappings at block 410, the first component may be subscribed to one or more the features of the second component. Subsequent to, and based on, the updated list being received at block 410, the subscription of the first component to the one or more features of the second component may be modified. In some implementations, subsequent to, and based on, receiving the updated list of mappings, the first component may transmit a connection request to a third component in the architecture. In response to the transmitted connection request being affirmed by the third component in the architecture, the first component may identify one or more new subscriptions between to the first component and the third component.

Figure 5:
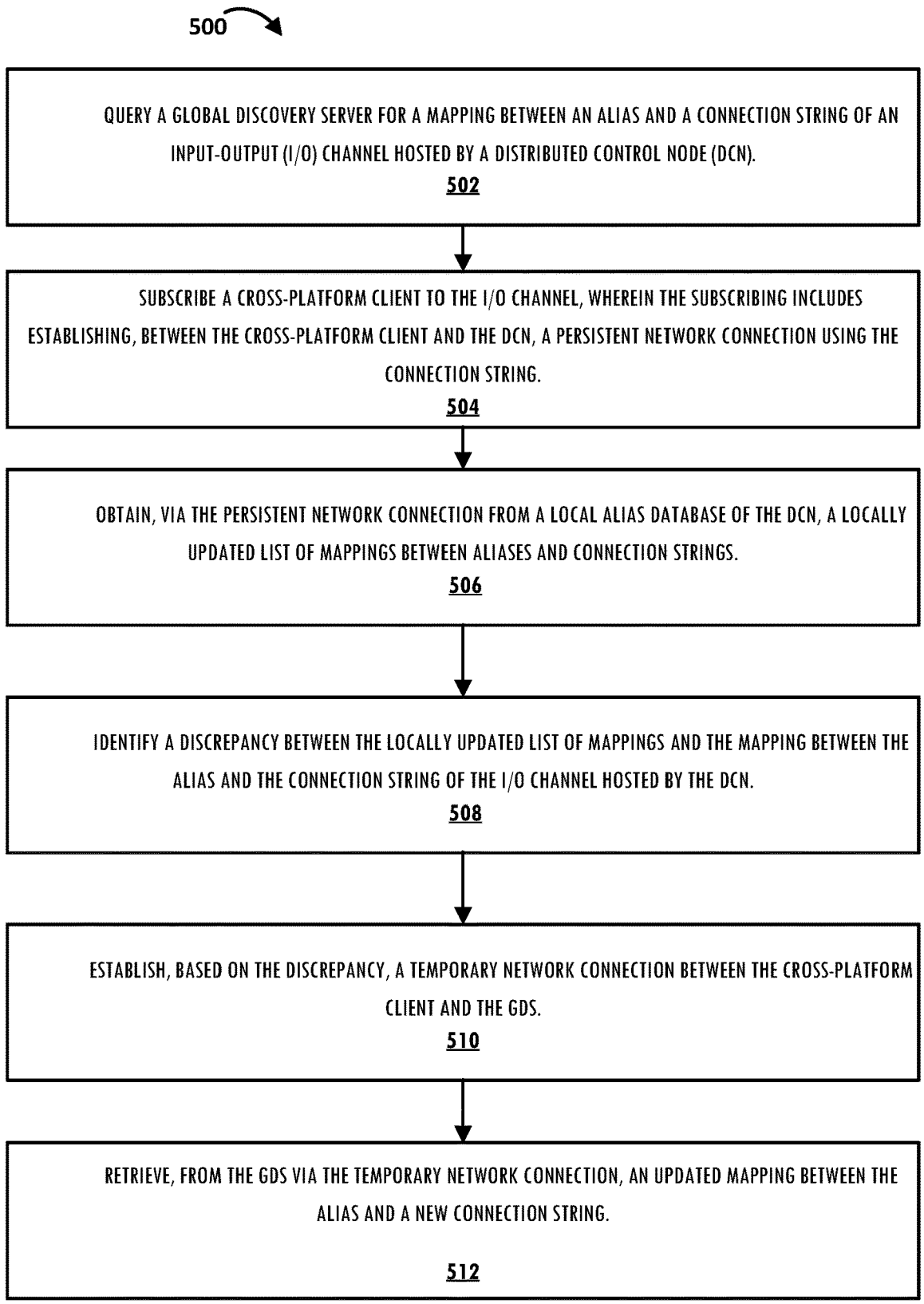
FIG. 5 schematically illustrates another example method for performing selected aspects of the present disclosure.

FIG. 5 is a flowchart illustrating an example method 500 of practicing selected aspects of the present disclosure, in accordance with implementations disclosed herein. For convenience, the operations of the flow chart are described with reference to a system that performs the operations. This system may include various components of various computer systems, such as one or more components described herein. Moreover, while operations of method 500 are shown in a particular order, this is not meant to be limiting. One or more operations may be reordered, omitted, and/or added.

At block 502, the system, e.g., by way of a cross-platform client (e.g., 270, 350) hosted by a DCN (e.g., 102, 202, 330A, 330B) queries a GDS (e.g., 104) for a mapping between an alias and a connection string of an I/O channel or function block hosted by a DCN. In various implementations, the query may be performed by a DCN (or components included therein), and/or a OPC UA client if, and/or to the extent, that a DCN and/or OPC UA are considered disparate in a given implementation. As shown in FIG. 3, in some implementations, a query may be propagated from a querying component through one or more non-querying components. The GDS may include an ANS (e.g., 290), which specializes in mapping components of the OPC UA such as I/O channels and/or function blocks to one or more aliases. In some implementations, the alias may be string of readily human-interpretable characters, such as a word or phrase.

At block 504, the system subscribes a cross-platform client to the I/O channel or function block. The subscribing may include, for instance, establishing, between the cross-platform client and the DCN, a persistent network connection using the connection string. In some implementations, the subscription may be temporary or persistent (e.g., akin to and/or using a TCP connection). In various implementations, the connection string may be static or dynamic.

At block 506, the system, e.g., by way of the cross-platform client, obtains, via the persistent network connection from a local alias database of the DCN, a locally updated list of mappings between aliases and connection strings. As discussed herein, in some implementations, components of an OPC UA, including DCNs, may include one or more local databases, including one or more local alias databases (e.g., 332, 352).

At block 508, the system, e.g., by way of the cross platform client, identifies a discrepancy between the locally updated list of mappings and the mapping between the alias and the connection string of the I/O channel hosted by the DCN subscribed to by the cross-platform client. In various implementations, the discrepancy may include duplicate aliases detected based at least in part on the locally updated list of mappings. Alternatively, the discrepancy may include the alias being missing from the locally updated list of mappings.

Based on the discrepancy, at block 510, the system establishes a temporary network connection between the cross-platform client and the GDS. In various implementations, the temporary network connection between the cross-platform client and the GDS may be direct or indirect. In some implementations in which the temporary network connection between the cross-platform client and the GDS is indirect, the network connection may also include one or more intermediary components included in a OPC UA. In various implementations, the network connection including one or more intermediary component of at least the OPC UA may entail data packets being propagated through and/or by the intermediary components, and/or being stored by the intermediary components.

At block 512, the system retrieves, from the GDS via the temporary network connection, an updated mapping between the alias and a new connection string. In various implementations the new connection string of the updated mapping may be associated with a different DCN. In some implementations, the new connection string of the updated mapping may be associated with a different I/O channel of the same DCN. In some implementations, the GDS transmits one or more alias updates in response to one or more changes in a compilation of mappings between aliases and connection strings.

In some implementations, method 500 may further include subscribing the cross-platform client to an updated I/O channel based on the new connection string of the updated mapping. In various implementations, method 500 may still further include closing the temporary network connection upon receipt of the updated mapping.

Figure 6:
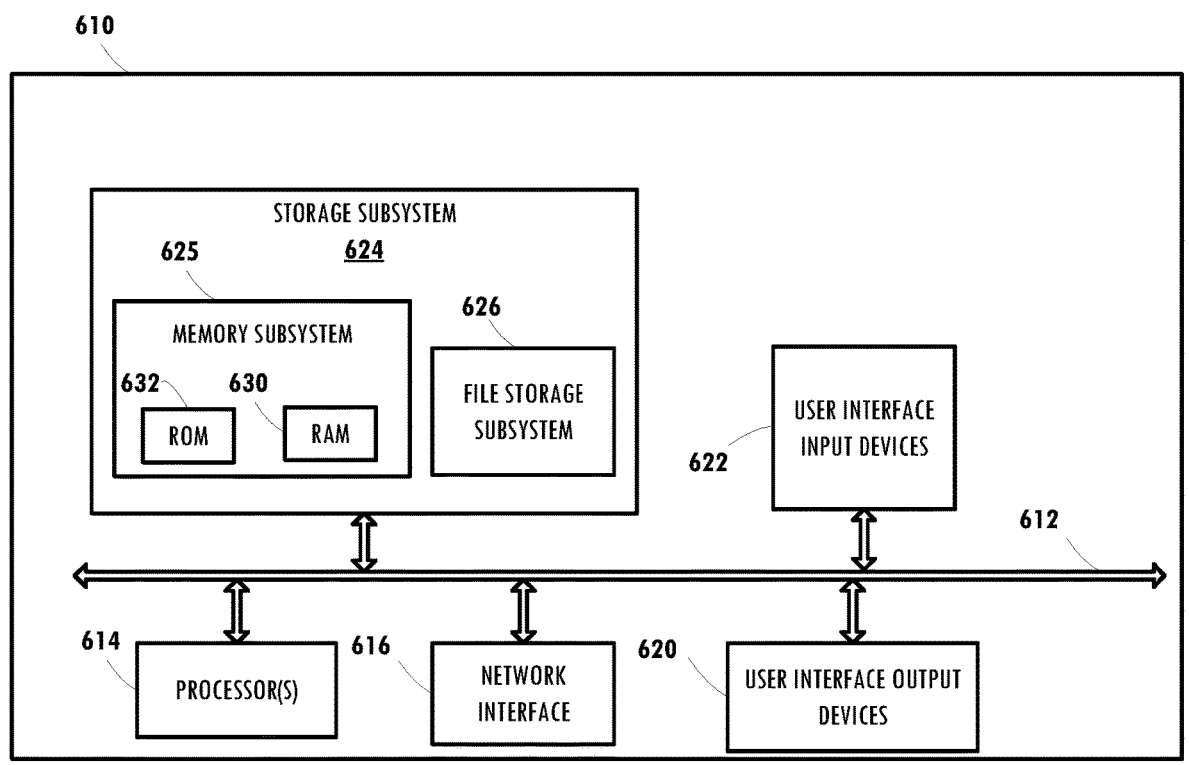
FIG. 6 schematically illustrates an example computer architecture on which selected aspects of the present disclosure may be implemented.

FIG. 6 is a block diagram of an example computing device 610 that may optionally be utilized to perform one or more aspects of techniques described herein. Computing device 610 typically includes at least one processor 614 which communicates with a number of peripheral devices via bus subsystem 612. These peripheral devices may include a storage subsystem 624, including, for example, a memory subsystem 625 and a file storage subsystem 626, user interface output devices 620, user interface input devices 622, and a network interface subsystem 616. The input and output devices allow user interaction with computing device 610. Network interface subsystem 616 provides an interface to outside networks and is coupled to corresponding interface devices in other computing devices.

User interface input devices 622 may include a keyboard, pointing devices such as a mouse, trackball, touchpad, or graphics tablet, a scanner, a touch screen incorporated into the display, audio input devices such as voice recognition systems, microphones, and/or other types of input devices. In general, use of the term "input device" is intended to include all possible types of devices and ways to input information into computing device 610 or onto a communication network.

User interface output devices 620 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 610 to the user or to another machine or computing device.

Storage subsystem 624 stores programming and data constructs that provide the functionality of some or all of the modules described herein. For example, the storage subsystem 624 may include the logic to perform selected aspects of the methods depicted in FIGS. 4 and 5, as well as to implement various components depicted in FIGS. 1-3.

These software modules are generally executed by processor 614 alone or in combination with other processors. Memory 625 used in the storage subsystem 624 can include a number of memories including a main random-access memory (RAM) 630 for storage of instructions and data during program execution and a read only memory (ROM) 632 in which fixed instructions are stored. A file storage subsystem 626 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 626 in the storage subsystem 624, or in other machines accessible by the processor(s) 614.

Bus subsystem 612 provides a mechanism for letting the various components and subsystems of computing device 610 communicate with each other as intended. Although bus subsystem 612 is shown schematically as a single bus, alternative implementations of the bus subsystem may use multiple busses.

Computing device 610 can be of varying types including a workstation, server, computing cluster, blade server, server farm, or any other data processing system or computing device. Due to the ever-changing nature of computers and networks, the description of computing device 610 depicted in FIG. 6 is intended only as a specific example for purposes of illustrating some implementations. Many other configurations of computing device 610 are possible having more or fewer components than the computing device depicted in FIG. 6.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure. Moreover, one or more portions of disclosure herein may exemplarily reference components and/or methods as being associated with Open Platform Communications Unified Architecture. This disclosure is in no way limited to OPC UA, and may be implemented across one or more cross-platform architectures and/or cross-platform components. Reference to OPC UA herein is exemplary of one or more applications of the disclosure herein, and should not be construed as limiting the disclosure in any way.

The invention claimed is:

1. A method, comprising:
   querying a global discovery server (GDS) for a mapping between an alias and a connection string of an input-output (I/O) channel hosted by a distributed control node (DCN);
   subscribing a cross-platform client to the I/O channel, wherein the subscribing includes establishing, between the cross-platform client and the DCN, a persistent network connection using the connection string;
   obtaining, via the persistent network connection from a local alias database of the DCN, a locally updated list of mappings between aliases and connection strings;
   identifying a discrepancy between the locally updated list of mappings and the mapping between the alias and the connection string of the I/O channel hosted by the DCN;
   based on the discrepancy, establishing a temporary network connection between the cross-platform client and the GDS; and
   retrieving, from the GDS via the temporary network connection, an updated mapping between the alias and a new connection string.

2. The method of claim 1, wherein the new connection string of the updated mapping is associated with a different DCN.

3. The method of claim 1, wherein the new connection string of the updated mapping is associated with a different I/O channel of the same DCN.

4. The method of claim 1, wherein the GDS transmits one or more alias updates in response to changes to a compilation of a global list of mappings between aliases and connection strings.

5. The method of claim 1, further comprising:
   subscribing the cross-platform client to an updated I/O channel based on the new connection string of the updated mapping.

6. The method of claim 1, wherein the discrepancy includes duplicate aliases detected based at least in part on the locally updated list of mappings.

7. The method of claim 1, wherein the discrepancy includes the alias being missing from the locally updated list of mappings.

8. The method of claim 1, further comprising closing the temporary network connection upon receipt of the updated mapping.

9. A method, comprising:
   identifying, at a first component included in an architecture, a first local list of mappings between aliases and connection strings;
   querying, based on the identification, a second component of the architecture for a verification of accuracy corresponding to the first local list;
   identifying, based on receiving a response to the query, a discrepancy between the first local list of mappings and at least a second local list of mappings of the second component;
   transmitting, based on the discrepancy, a request to the second component or another component of the architecture for an updated list of mappings; and
   updating, at the first component and in response to receiving the updated list of mappings, the first local list of mappings.

10. The method of claim 9, wherein the first component is a cross-platform client and the second component is a global discovery server (GDS).

11. The method of claim 9, wherein the first component is a cross-platform client and the second component is a distributed control node (DCN).

12. The method of claim 11, wherein the transmitted request is to the other component, and the other component is a global discovery server (GDS).

13. The method of claim 9, wherein the first component is a first distributed control node (DCN) and the second component is another DCN.

14. The method of claim 9, further comprising:
   subsequent to updating the first local list of mappings:
      modifying one or more subscriptions of the first component based on the updated list of mappings.

15. The method of claim 9, further comprising:
   prior to querying the second component of the architecture:
      determining a current persistent connection with the second component.

16. The method of claim 15, wherein prior to querying the second component, the current persistent connection corresponds with a subscription of the first component to the second component.

17. The method of claim 16, wherein prior to querying the second component, the second component identifies a modification of one or more features hosted by the second component, and wherein the updated list of mappings reflects the modification.

18. The method of claim 17, wherein, based on the updated list of mappings reflecting the modification, the subscription of the first component to the second component is updated or terminated.

19. The method of claim 9, further comprising:
subsequent to updating the first local list of mappings:
  transmitting, from the first component and based on the updated list, a connection request to a third component in the architecture, and
  identifying, in response to the connection request being affirmed by the third component, one or more new subscriptions between the first component and the third component.

20. A system comprising:
one or more computers and one or more storage devices storing instructions that are operable, when executed by the one or more computers, to cause the one or more computers to perform operations comprising:
  querying a global discovery server (GDS) for a mapping between an alias and a connection string of an input-output (I/O) channel hosted by a distributed control node (DCN);
  subscribing a cross-platform client to the I/O channel, wherein the subscribing includes establishing, between the cross-platform client and the DCN, a persistent network connection using the connection string;
  obtaining, via the persistent network connection from a local alias database of the DCN, a locally updated list of mappings between aliases and connection strings;
  identifying a discrepancy between the locally updated list of mappings and the mapping between the alias and the connection string of the I/O channel hosted by the DCN;
  based on the discrepancy, establishing a temporary network connection between the cross-platform client and the GDS; and
  retrieving, from the GDS via the temporary network connection, an updated mapping between the alias and a new connection string.

* * * * *

UNITED STATES PATENT AND TRADEMARK OFFICE
CERTIFICATE OF CORRECTION

| | | |
|---|---|---|
| PATENT NO. | : 12,407,642 B2 | Page 1 of 1 |
| APPLICATION NO. | : 18/375883 | |
| DATED | : September 2, 2025 | |
| INVENTOR(S) | : Nguyen | |

It is certified that error appears in the above-identified patent and that said Letters Patent is hereby corrected as shown below:

On the Title Page

Item (73) Assignee, Please change "GOOGLE LLC" to -- Yokogawa Electric Corporation, Tokyo (JP) --.

Signed and Sealed this
Thirtieth Day of December, 2025

John A. Squires
*Director of the United States Patent and Trademark Office*